(12) United States Patent
Skogen

(10) Patent No.: US 9,823,497 B1
(45) Date of Patent: Nov. 21, 2017

(54) ELECTROABSORPTION OPTICAL MODULATOR

(71) Applicant: National Technology & Engineering Solutions of Sandia, LLC, Albuquerque, NM (US)

(72) Inventor: Erik J. Skogen, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/095,516

(22) Filed: Apr. 11, 2016

(51) Int. Cl.
*G02F 1/035* (2006.01)
*G02F 1/017* (2006.01)
*H04B 10/516* (2013.01)
*G02F 1/015* (2006.01)

(52) U.S. Cl.
CPC ....... *G02F 1/01708* (2013.01); *H04B 10/516* (2013.01); *G02F 2001/0155* (2013.01); *G02F 2001/01766* (2013.01)

(58) Field of Classification Search
CPC .. G02F 1/225; G02F 2001/212; G02F 1/2255; G02F 1/025; G02F 1/2257
See application file for complete search history.

(56) References Cited

U.S. PATENT DOCUMENTS

| 7,995,877 | B1 | 8/2011 | Skogen et al. | |
| 8,964,804 | B2 * | 2/2015 | Heimbuch | H01S 5/06213 |
| | | | | 372/26 |
| 2005/0094914 | A1 * | 5/2005 | Gines | B82Y 20/00 |
| | | | | 385/1 |
| 2005/0128557 | A1 * | 6/2005 | Kim | H01S 5/0264 |
| | | | | 359/241 |
| 2008/0101425 | A1 * | 5/2008 | Murata | B82Y 20/00 |
| | | | | 372/26 |

OTHER PUBLICATIONS

Raring et al, 40-Gb/s Widely Tunable Transceivers, *IEEE Journal of Selected Topics in Quantum Electronics*, V.13, No. 1, Jan./Feb. 2007, pp. 3-14.
Skogen et al, Monolithically Integrated Active Components: A Quantum-Well Intermixing Approach, *IEEE Journal of Selected Topics in Quantum Electronics*, V.11, No. 2, Mar./Apr. 2005, pp. 343-355.

* cited by examiner

*Primary Examiner* — Jennifer Doan
(74) *Attorney, Agent, or Firm* — Martin I. Finston

(57) ABSTRACT

An electroabsorption modulator incorporates waveguiding regions along the length of the modulator that include quantum wells where at least two of the regions have quantum wells with different bandgaps. In one embodiment of the invention, the regions are arranged such that the quantum wells have bandgaps with decreasing bandgap energy along the length of the modulator from the modulator's input to its output. The bandgap energy of the quantum wells may be decreased in discrete steps or continuously. Advantageously, such an arrangement better distributes the optical absorption as well as the carrier density along the length of the modulator. Further advantageously, the modulator may handle increased optical power as compared with prior art modulators of similar dimensions, which allows for improved link gain when the optical modulator is used in an analog optical communication link.

18 Claims, 7 Drawing Sheets

ELECTROABSORPTION OPTICAL MODULATOR

GOVERNMENT RIGHTS IN THIS INVENTION

This invention was made with U.S. government support under contract DE-AC04-94AL85000 awarded by the U.S. Department of Energy. The U.S. government has certain rights in this invention.

TECHNICAL FIELD

This invention relates to optical modulators, and more particularly, to electroabsorption optical modulators.

BACKGROUND OF THE INVENTION

An optical modulator is a device which can be used for manipulating a property of light, often of an optical beam, e.g. a laser beam. Depending on which property of light is controlled, modulators may be intensity modulators, phase modulators, polarization modulators, spatial light modulators, and so forth. A wide range of optical modulators are used in very different application areas, such as in optical fiber communications, displays, mode locking of lasers, and the like.

An electroabsorption modulator is a device which can be used for modulating the intensity of a light beam in response to an applied voltage. Such devices are often useful for optical communications. As is well known in the art, carriers are generated by the optical absorption of photons in the modulator. More specifically, a photon that has an energy corresponding to a wavelength that is near or above the bandgap energy, which is also referred to as the bandgap wavelength, will be absorbed. Typically such absorption will result in the generation of an electron-hole pair.

Once a certain density of electron-hole pairs is reached, the electron-hole pairs will start to screen the externally applied electric field, in that the buildup of electrons and holes in a particular location reduces the strength of the externally applied field. Unfortunately, this has the detrimental effect on modulator performance of lowering the modulation bandwidth, i.e., the rate at which the modulator can be changed from a transmissive state that allows a prescribed amount of the light through, to a blocking state and back. This is due to higher capacitance resulting from the high carrier concentrations.

Prior art electroabsorption modulators typically incorporate a single bandgap along the optical path. Disadvantageously, this limits the optical power-handling ability of such an electroabsorption modulator due to the aforementioned carrier screening effects. Additionally, the modulation bandwidth of the prior art electroabsorption modulators is less than ideal for high-input optical power applications, and the device could be damaged if fed with high optical power.

SUMMARY OF THE INVENTION

I have recognized that the above-enumerated disadvantages of prior art electroabsorption modulators can be overcome, in accordance with the principles of the invention, by an electroabsorption modulator that incorporates waveguiding regions along the length of the modulator that include quantum wells where at least two of the regions have quantum wells with different bandgaps. In one embodiment of the invention, the regions are arranged such that the quantum wells have bandgaps with decreasing bandgap energy along the length of the modulator from the modulator's input to its output. The bandgap energy of the quantum wells may be decreased in discrete steps or continuously. Advantageously, such an arrangement better distributes the optical absorption as well as the carrier density along the length of the modulator. Further advantageously, the modulator may handle increased optical power as compared with prior art modulators of similar dimensions, which allows for improved link gain when the optical modulator is used in an analog optical communication link.

In one embodiment of the invention, the modulator has positioned along its length at least two sets of quantum wells. The number of sets can range widely, and by using small gradations, it is even possible to have an effectively infinite number of sets. Each set typically is localized to one of the above-mentioned regions. There are typically 1 to 20 quantum wells in a set. The number of sets and the number of quantum wells per set are determined based on the particular application for which, or on the conditions under which, the modulator is to be used Each quantum well set is arranged to have a different absorption bandgap, i.e., the point at which absorption of light for that set of quantum wells substantially begins in the optical spectrum, and each is positioned along and within the same wave guiding path, e.g., within the waveguide core along the wave guiding axis of the modulator in the direction of light propagation.

The sets of quantum wells are arranged so as to progressively increase their coefficient of absorption, which is an indication of their ability to absorb light, at the wavelength of interest, from the optical input onward along the wave guiding axis. This change in optical absorption coefficient along the path, which is a function of the bandgap, controls the magnitude of optical absorption from the beginning of the optical waveguide to its end. It therefore yields a more uniform distribution of generated electronic carriers, i.e., electron-hole pairs, which can mitigate the screening effects caused by high electronic carrier densities such as electric field collapse and the bandwidth reduction. In other words, the optical absorption coefficient is increased along the path of the modulator so as to reduce the density of generated carriers at the beginning of the modulator and subsequently along the optical path, thus increasing the absorption coefficient over the path in order to achieve a lower variance of the distribution of generated electron-hole pairs.

In accordance with embodiments of the invention, at the beginning of the waveguide path, e.g., at its input, the absorption coefficient is lower at the wavelength of interest but there is more optical power at that wavelength, whereas at the end of the waveguide path, the absorption coefficient at the wavelength of interest is higher but there is less optical power at that wavelength. Advantageously, a goal of having the total absorbed optical power per unit length remain constant can be more closely achieved.

Put another way, advantageously, in accordance with some embodiments of the invention, the distribution of the carriers along the waveguide path may have less variance than prior art devices as well as a lower peak in each section of the waveguide, especially at the beginning of the optical path.

The different regions of absorption can be created using selective quantum well intermixing.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry or components embodying the principles of the invention. Similarly, it will be appreciated that any flow charts, flow diagrams, state transition diagrams, pseudocode, process descriptions and the like represent various processes which may be substantially represented in computer readable medium and so executed by a computer or processor, whether or not such computer or processor is explicitly shown.

Unless otherwise explicitly specified herein, the drawings are not drawn to scale.

In the description, identically numbered components within different figures refer to the same components.

Figure 1:
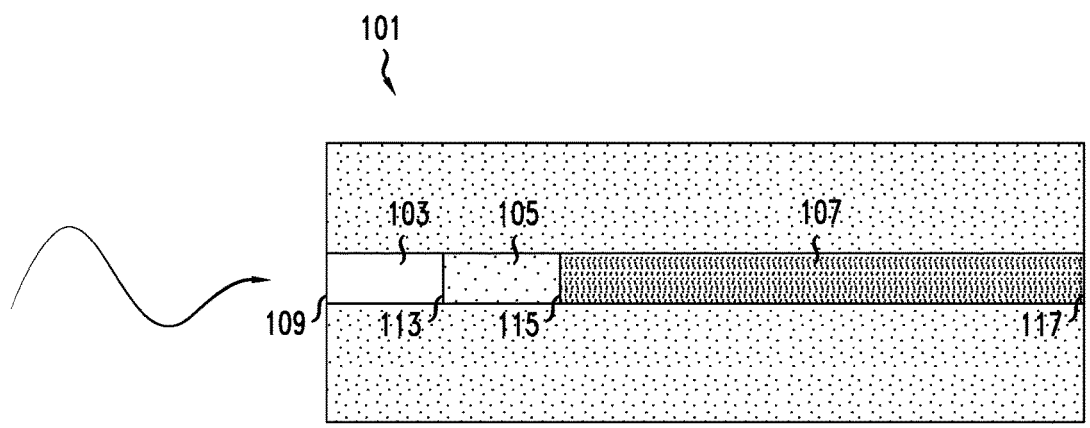
FIG. 1 shows a conceptual side view of an exemplary electroabsorption modulator arranged in accordance with the principles of the invention.

FIG. 1 shows a conceptual side view of exemplary electroabsorption modulator 101 arranged in accordance with the principles of the invention. In the manner shown, electroabsorption modulator 101 has exemplary regions 103, 105, and 107 along its length, i.e., along the path that light travels through modulator 101 from input 109 to output 117. In one embodiment of the invention, regions 103, 105, and 107 are arranged to have sequentially decreasing bandgap energy along the length of modulator 101 from input 109 to output 117. In other words, the bandgap energy of region 103 is greater than the bandgap energy of region 105 and the bandgap energy of region 105 is in turn greater than the bandgap energy of region 107. Note that although only two regions are necessary in accordance with the principles of the invention, for ease of understanding three regions are being shown.

In one embodiment of the invention, the bandgap energy across each of regions 103, 105, and 107 is constant and the bandgap energy changes at region boundaries 113 and 115. Such an embodiment will be the primary focus of discussion hereinbelow. However, although FIG. 1 may be thought of as showing that the bandgap energy is decreased in discrete steps along modulator 101, the bandgap energy may be continuously decreased in one or more of the regions 103, 105 and 107. It will thus be recognized that there may be embodiments of the invention in which the bandgap energy across at least one of regions 103, 105, and 107 is constant and in yet further embodiments of the invention the bandgap energy across at least one of regions 103, 105, and 107 may vary, e.g., continuously.

If the bandgap energy is decreased continuously in each of two adjacent regions, there still may be discontinuities at the region boundaries, e.g., at region boundary 113 between regions 103 and 105 and region boundary 115 between regions 105 and 107. Alternatively, a single continuous region may be created in the modulator. Such a continuous region may be viewed either 1) as being divided into two different regions along any desired point such that each of the resulting regions has a different overall bandgap energy or 2) as an infinite number of discrete regions.

Advantageously, by arranging the bandgaps as indicated hereinabove, the optical absorption and the carrier density are better distributed along the length of the modulator. Further advantageously, the modulator may handle increased optical power as compared with prior art modulators of similar dimensions, which allows for improved link gain when the optical modulator is used in an analog optical communication link.

Along the waveguidng path of modulator 101, which extends from input 109 through each of regions 103, 105, and 107 until output 117, there are at least two sets of quantum wells. To this end, in the embodiment of FIG. 1, each of regions 103, 105, and 107 contains a respective set of quantum wells. Although exemplary modulator 101 conceptually contains three sets of quantum wells, i.e., the quantum wells within regions 103, 105, and 107, it is sufficient for an electroabsorption modulator arranged in accordance with the principles of the invention to have positioned along its lightguiding path two sets of quantum wells.

There are typically 1 to 20 quantum wells in each set. When the bandgap energy is continuously decreased along the entire length of the optical path of an electroabsorption modulator, there are effectively an infinite number of sets. The number of sets, as well as the number of quantum wells in each set, are determined per application, e.g., depending on whether the modulator is used for an analog link, a digital link, or a computing device. Exemplary factors that are adjusted according to the application, and that may be affected by the number of quantum wells in the device, and in each region thereof, include insertion loss of the modulator, extinction ratio required, capacitance of the modulator, and optical confinement factor of the multiquantum well set.

Each quantum well set possesses a different absorption bandgap, i.e., where absorption for that set of quantum wells substantially begins in the optical spectrum, and is positioned along the same wave guiding path, i.e., along the wave guiding axis in the direction of light propagation. As noted, in some embodiments of the invention the modulator is arranged so that its optical absorption coefficient, which is a function of the bandgap, is increased along the path of the modulator to thereby reduce the density of generated carriers at the beginning of the modulator and subsequently along the optical path, thus increasing the absorption coefficient over the path in order to achieve a lower variance of the distribution of generated electron-hole pairs.

In the exemplary embodiment of FIG. 1, the sets of quantum wells may be arranged so as to progressively increase in their ability to absorb light at the wavelength of interest from optical input 109 onward along the waveguiding axis toward optical output 117. Thus, the set of quantum wells making up region 107 may have a higher absorption coefficient at the wavelength of interest than the set of quantum wells making up region 105, which in turn may have a higher absorption coefficient at the wavelength of interest than the quantum wells making up region 103.

Such a change in absorption coefficient along the waveguiding path controls the magnitude of optical absorption from input 109 of electroabsorption modulator 101 to output 117 and therefore yields a more uniform distribution of generated electronic carriers, i.e., electron-hole pairs, which mitigates the effects of high electronic carrier densities, electric field collapse, and frequency bandwidth reduction. In accordance with such embodiments of the invention, at the beginning of the waveguide path through the modulator, e.g., at input 109, the absorption coefficient is lower at the wavelength of interest but there is more optical power at that wavelength while at the end of the waveguide path the absorption coefficient at the wavelength of interest is higher but there is less optical power at that wavelength.

Advantageously, a goal of having the total absorbed optical power per unit length remain constant is more closely achieved. In other words, advantageously, the distribution of the carriers along the waveguide path has less variance than prior art devices and a lower peak at each section of the waveguide, and importantly at the beginning of the optical path.

Figure 2:
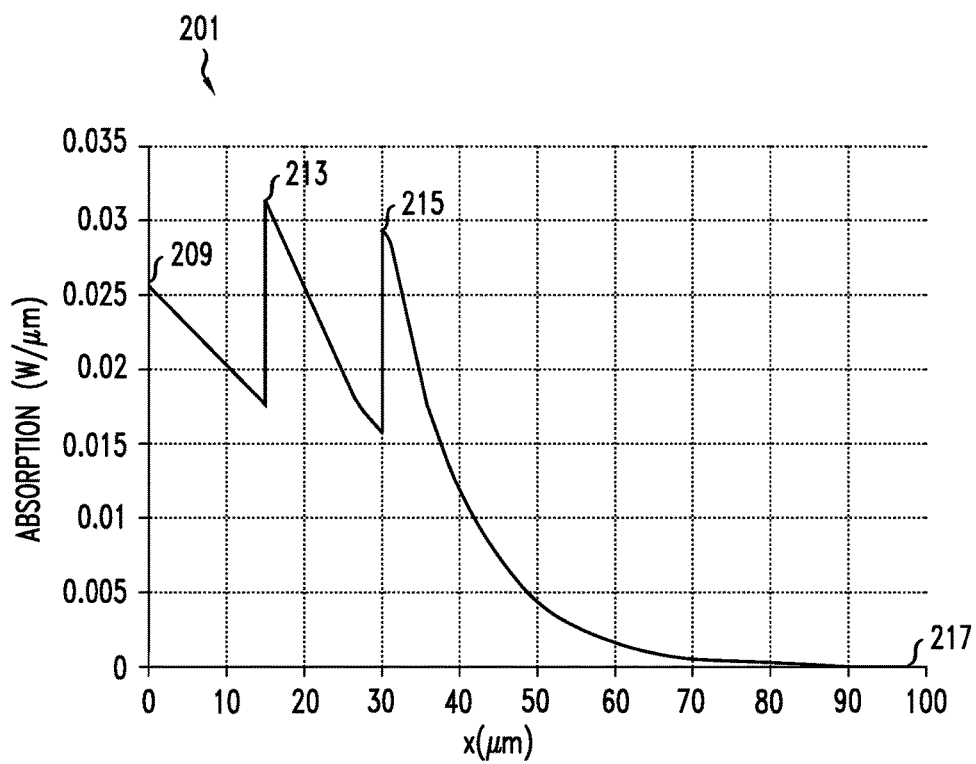
FIG. 2 shows an exemplary graph of absorption versus path distance for the optical modulator of FIG. 1 when an appropriate voltage is applied to activate the modulator to absorb light.

FIG. 2 shows exemplary graph 201 of absorption versus path distance for exemplary optical modulator 101 (FIG. 1) when an appropriate voltage is applied to activate modulator 101 to absorb light. Point 209 (FIG. 2) corresponds to the absorption just as the light enters into modulator 101 (FIG. 1) at input 109. As the light penetrates further into region 103 of modulator 101, the fraction of optical power that is absorbed per unit penetration distance is constant (because in this example region 103 has a constant absorption coefficient). Hence the absorption in absolute terms drops monotonically, approximately along an exponential decay curve, as the optical power is attenuated.

Just as the light transitions into region 105 from region 103 at interface 113, the absorption rate increases, as shown at point 213 (FIG. 2), which may, but need not, be greater than even the initial absorption rate upon entering the modulator, e.g., as shown. As the light travels through region 105 (FIG. 1) of modulator 101, the absorption again continues at a rate that that typically decays exponentially from the initial rate upon entering region 105 due to continued attenuation. Thereafter, just as the light transitions into region 107 from region 105 at interface 115 the absorption rate again increases, as shown at point 215 (FIG. 2), which may, but need not, be greater than the absorption rate upon entering the prior region.

As the light travels through region 107 (FIG. 1) of modulator 101, the absorption again continues, but at a rate that is typically continually reduced from the initial rate upon entering region 107 due to continued reduction in the optical power, until essentially all of the light has been absorbed. Thus, at point 217 (FIG. 2) corresponding to output 117 of modulator 101, the absorption rate is essentially zero as all of the light has been absorbed.

In accordance with an aspect of the invention, the different regions of absorption can be created using selective quantum well intermixing.

Figure 3A:
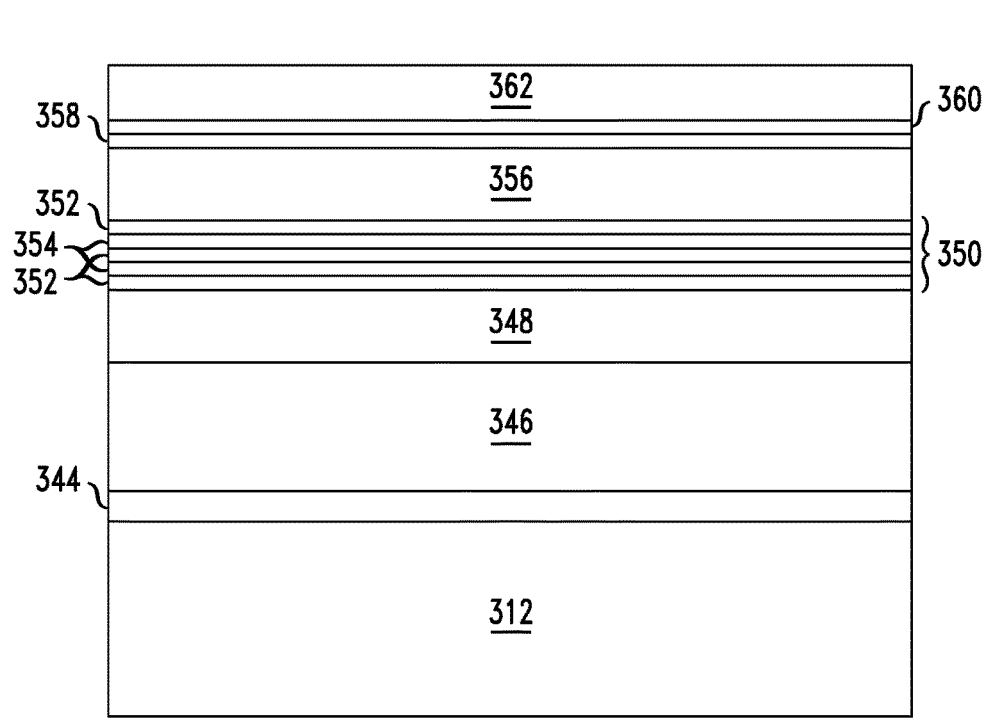
FIGS. 3A through 3F show a more detailed side view of the exemplary electroabsorption modulator of FIG. 1 at various points in its fabrication.

FIG. 3A shows a more detailed side view of exemplary electroabsorption modulator 101 arranged in accordance with the principles of the invention. More specifically, FIG. 3A shows an exemplary schematic cross-section view of III-V compound semiconductor layers which are grown, e.g., epitaxially, on substrate 312 in preparation for fabricating an embodiment of the electroabsorption optical modulator of the present invention, e.g., as shown in FIG. 1.

When substrate 312 includes or is made up of InP, the III-V compound semiconductor layers may include, for example, layers of indium phosphide (InP), indium gallium arsenide phosphide (InGaAsP), indium gallium arsenide (InGaAs), indium aluminum gallium arsenide (InAlGaAs) layers, and combinations thereof.

Alternatively, when substrate 312 includes or is made up of GaAs, the III-V compound semiconductor layers may be layers of gallium arsenide (GaAs), aluminum gallium arsenide (AlGaAs), InGaAsP, InGaAs, and combinations thereof. As will be recognized, the particular material of which the substrate is made may be chosen by those of ordinary skill in the art so as to be suitable for the application for which the electroabsorption modulator is to be employed, and the material may be doped or undoped, again depending upon the application.

The following discussion will describe an example of the fabrication of an optical modulator that uses InP as the material for substrate 312, with InP, InGaAsP and InGaAs layers thereon, as explained in more detail hereinbelow. However, those of ordinary skill in the art will understand that the various process steps described can be applied with minor modifications to an optical modulator formed on a substrate 312 made of GaAs with a combination of GaAs, AlGaAs, InGaAsP, and InGaAs layers thereon. Those of ordinary skill in the art will also understand that other III-V compound semiconductor materials may be used for substrate 312 and the layers grown thereon.

In FIG. 3A, substrate 312 is an exemplary semi-insulating Fe-doped InP substrate or an Sn-doped InP conducting substrate. A plurality of exemplary III-V compound semiconductor layers are grown, e.g., epitaxially, on substrate 312 using any known technique, one such technique being metal-organic chemical vapor deposition (MOCVD).

These exemplary III-V compound semiconductor layers are, in order of growth on substrate 312:

a) an InP buffer layer (not shown),
b) an n-type InGaAs lower contact layer 344;
c) a lower cladding layer 346 of n-type-doped InP having a thickness in a range of about 0.5 μm to about 5 μm, e.g., about 1-2 μm thick;
d) a lower waveguide layer 348 of InGaAsP which is undoped, i.e., not intentionally doped, and has a thickness in a range of about 0.02 μm to about 0.5 μm, e.g., about 0.11 μm thick, with a composition selected to provide an energy bandgap wavelength, $\lambda_g$, of about 1.265 μm;
e) an undoped multiple quantum well (MQW) region 350 which has a thickness in a range of about 0.01 μm to about 0.5 μm, e.g., about 0.11 μm thick, and is made up of at least one barrier layer 352 and at least one quantum well (QW) layer 354, with possibly further alternating barrier layers 352 and quantum well layers 354, followed by a final barrier layer 352, with quantum well layers 354 having a thickness in a range of about 2 nm to about 15 nm, e.g., about 8.0 nm thick, and having an energy bandgap wavelength, $\lambda_g$, of about 1.596 μm, e.g., as measured by photoluminescence, and with barrier layers 352 having a thickness in a range of about 2 nm to about 15 nm, e.g., about 8.0 nm thick, and having an energy bandgap wavelength, $\lambda_g$, of about 1.265 μm;

f) an upper waveguide layer 356 of undoped InGaAsP having a thickness of about 0.02 μm to about 0.5 μm, e.g., about 0.11 μm thick, and having an energy bandgap wavelength, $\lambda_g$, of about 1.265 μm;

g) an undoped InP etch stop layer 358 having a thickness in a range of about 50 nm to about 250 nm, e.g., about 15 nm thick;

h) an undoped InGaAsP etch stop layer 360 having a thickness in a range of about 5 nm to about 40 nm, e.g., about 20 nm thick, being sufficiently different in character from layers 358 and 362 to act as an etch stop layer, e.g., arranged to have an energy bandgap wavelength, $\lambda_g$, of about 1.3 μm; and i) an undoped InP implant buffer layer 362 having a thickness in a range of about 0.01 μm to about 2 μm, e.g., about 0.45 μm thick.

As an example, the quantum well (QW) layers 354 can have the semiconductor alloy composition $In_xGa_{1-x}As_yP_{1-y}$ with x=0.708 and y=0.812 to provide the energy bandgap wavelength $\lambda_g$=1.596 μm; and barrier layers 352 can be formed of $In_xGa_{1-x}As_yP_{1-y}$ with x=0.708 and y=0.569 to provide the energy bandgap wavelength, $\lambda_g$=1.265 μm. The quantized energy bandgap of a quantum well for this particular well and barrier combination is $\lambda_g$=1.505 μm. Those skilled in the art will readily understand that the exact composition of layers 354 and 352 in MQW region 350 and the compositions of the other III-V compound semiconductor layers can be adjusted as needed to provide specified values for energy bandgaps of these layers, with the energy bandgap wavelength $\lambda_g$ of QW layers 354 generally being in the range of about 0.8-2.0 μm.

A barrier layer, quantum well layer, barrier layer make up a single quantum well. The quantum wells extend along the length of the region. Typically there are between 1 and 20 quantum wells with the particular number chosen being dependent on the application for which modulator 101 is to be employed.

If suitable for the particular application, quantum wells formed with the initially resulting bandgap energy may be used for one or more of the regions. For pedagogical purposes of the present example, it is assumed that the initial bandgap energy is suitable for region 107.

An ion implant mask (not shown), e.g. comprising silicon nitride in a thickness range of about 0.1 μm to about 2 μm, e.g., about 0.5 μm thick, can then be provided over substrate 312 and the III-V compound semiconductor layers with openings at those locations at which phosphorus ions are to be implanted into InP implant buffer layer 362 for use in intermixing MQW region 350 in order to change the bandgap of different regions thereof. In this example, where the assumption is that the quantum wells with the initially resulting bandgap energy may be used for region 107, the ion implant mask is thus at least over region 107, so that its bandgap energy is not changed by subsequent processing.

The phosphorus ions can be implanted into InP implant buffer layer 362 at an ion energy in a range of about 25 keV to about 400 keV, e.g., about 100 keV, and a dose in a range of about $5 \times 10^{13}$ to about $5 \times 10^{15}$, e.g., about $5 \times 10^{14}$ cm$^{-2}$, with substrate 312 being at a temperature in the range of about 25° C. to about 400° C., e.g., about 200° C. The implanted phosphorus ions produce point defects in the InP implant buffer layer 362.

Figure 3B:
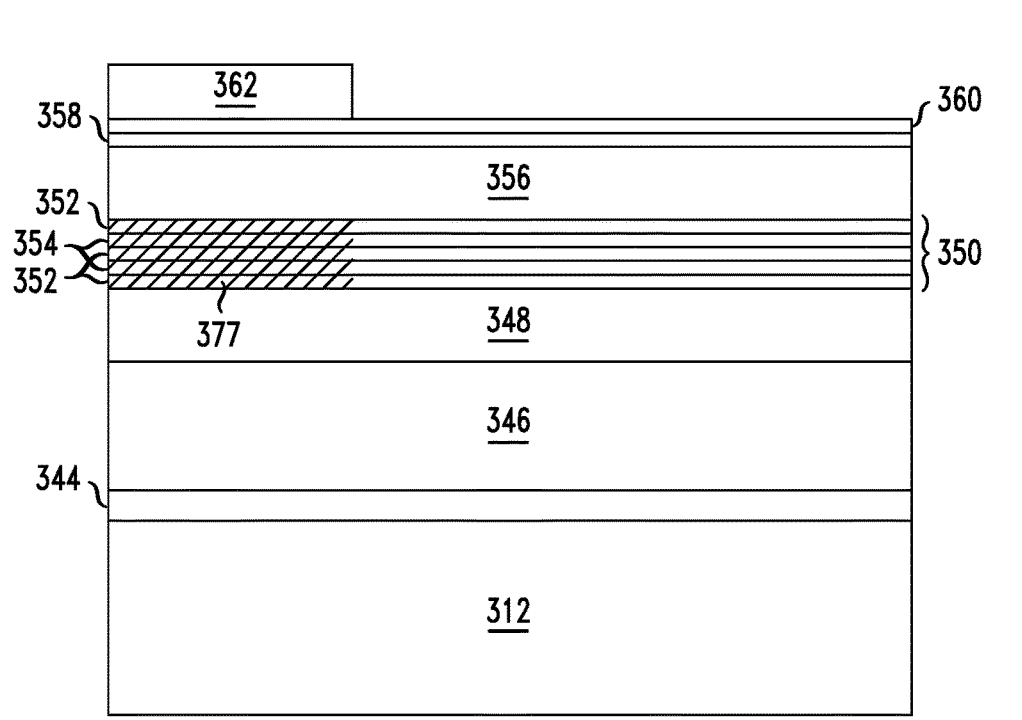

The implanting only creates damage in layer 362. If layer 362 is not present, then there are no defects to move down into the quantum wells during annealing. As such, given that the quantum wells with the initially resulting bandgap energy are used in the present example for region 107, layer 362 is etched away over region 107, e.g., using a wet etch process down to InGaAsP etch stop layer 360, as shown in FIG. 3B. Thus, there will be no defects to move into the quantum wells of region 107. Alternatively, just using the implant mask can be sufficient or further in the alternative, just removing layer 362 can also be sufficient.

A first rapid thermal annealing step can then be used to drive the point defects down into MQW region 350 to cause intermixing of QW layers 354 and barrier layers 352 at the interfaces between them. This intermixing produces a blue-shift in the energy bandgap wavelength in MQW region 350. The rapid thermal annealing step can be performed at a temperature in the range of about 630-700° C. for a time interval from about one second up to about a few tens of minutes to provide a specified energy bandgap wavelength for MQW region 350. Thus, the ultimately resulting bandgap will depend upon the exact elements used in the electroabsorption modulator being formed and the annealing performed.

More specifically, to form electroabsorption modulator 101, a first rapid thermal annealing step can be used to provide, for example, a few tens of nanometer blue-shift in the energy bandgap wavelength of MQW region 350, e.g. to change $\lambda_g$ to about 1.495 μm, to reduce its absorption loss in the absence of any applied, e.g., a reverse-bias voltage as noted hereinbelow. The resulting blue-shift in the energy bandgap wavelength of MQW region 350 can be verified, e.g., by using a laser-excited room-temperature photoluminescence spectroscopy measurement. The resulting MQW region 377, which has a second bandgap energy and which at this point extends over regions 103 and 105, is also shown in FIG. 3B.

Figure 3C:
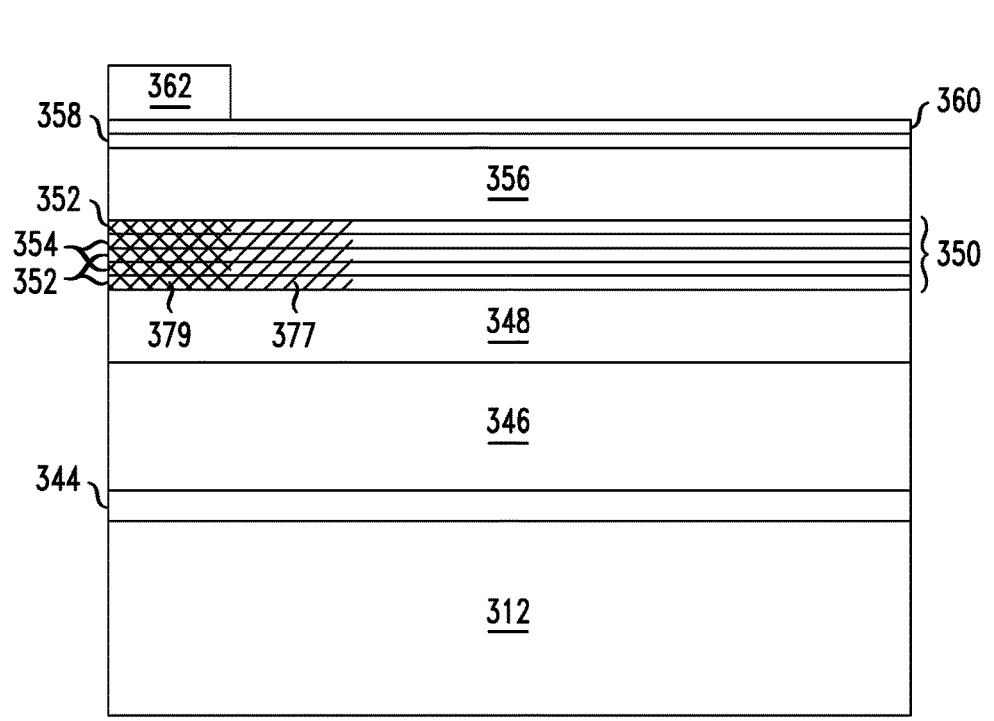

After the first rapid thermal annealing step the InP implant buffer layer 362 may be further removed above electroabsorption modulator 101 in regions that do not require additional shifting of the bandgap energy, e.g., as shown in FIG. 3C, where InP implant buffer layer 362 only remains above region 103. This can be done using a wet etching step to etch away the layer 362, with the wet etching being terminated upon reaching the InGaAsP etch stop layer 360. Removal of the InP implant buffer layer 362 from regions above the electroabsorption modulator 101 prevents any further blue-shift in MQW region 350 at those regions below which it is removed since removal of the InP implant buffer layer 362 removes the source of point defects necessary for quantum-well intermixing.

A second rapid thermal annealing step can then be performed at about the same temperature for from about one second up to a few tens of minutes to provide a specified energy bandgap wavelength for MQW region 350, to provide a third bandgap energy in modulator 101. The resulting MQW region 379, which has a third bandgap energy and extends over regions 103, is also shown in FIG. 3C.

This process can be repeated a number of times to create any number of different bandgap energy regions along the waveguide path of the modulator.

Figure 3D:
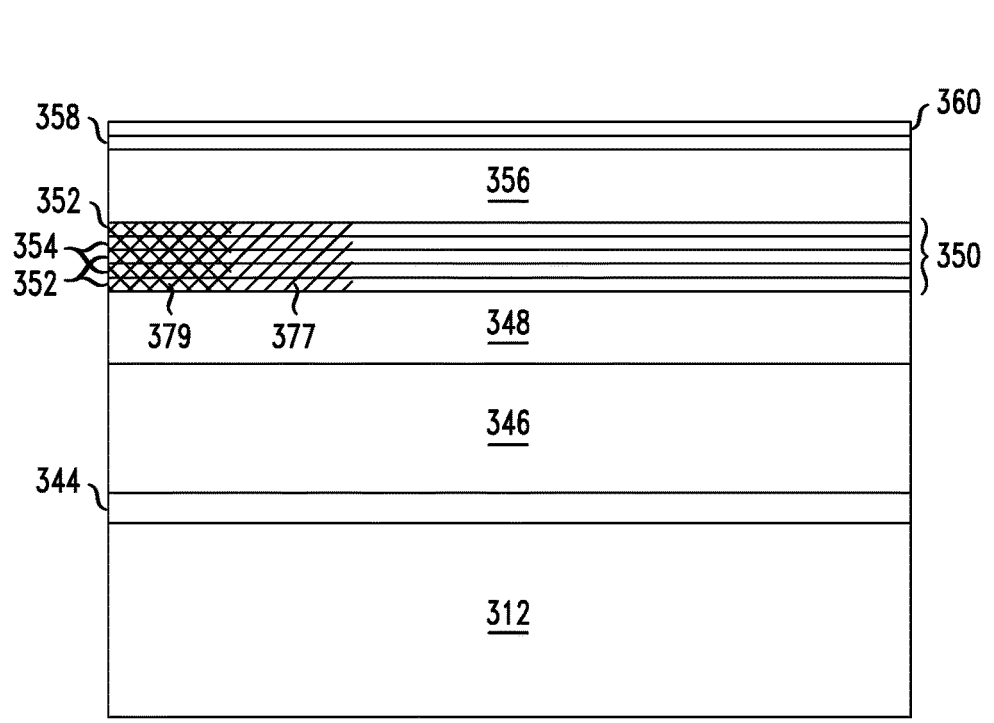
Figure 3E:
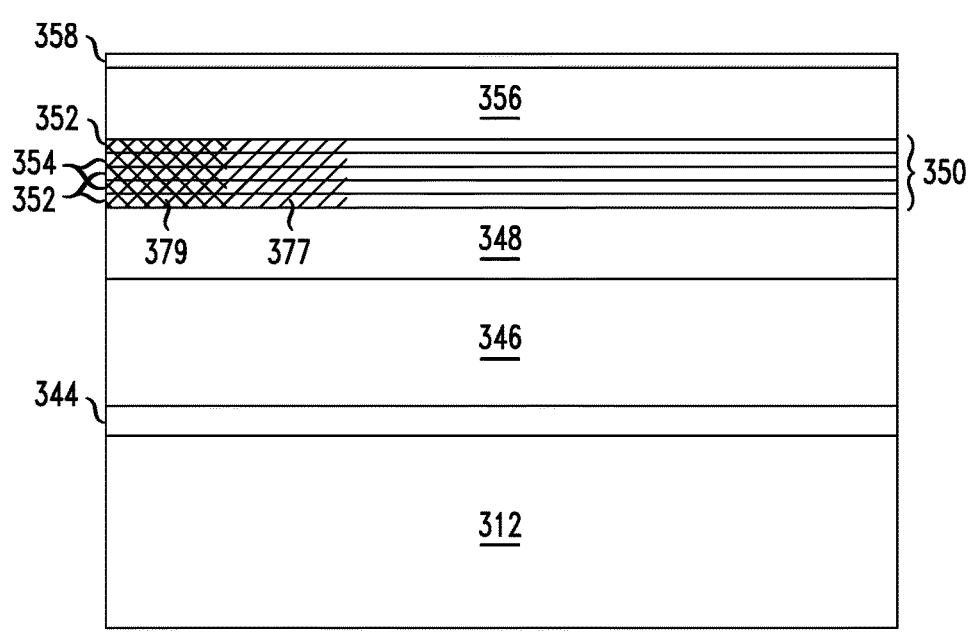

After the final rapid thermal annealing step is performed, the remaining InP implant buffer layer 362 and InGaAsP etch stop layer 360 can be completely removed from substrate 312 by wet etching. Modulator 101 with implant buffer layer 362 removed is shown in FIG. 3D. Modulator 101 with InGaAsP etch stop layer 360 removed is shown in FIG. 3E.

A blanket MOCVD regrowth can then be performed to grow, e.g., epitaxially, an upper cladding layer 364 of p-type-doped InP which can be, for example, having a thickness in a range of 1.5 µm to 2.5 µm, e.g., 2.35 µm thick. Upper cladding layer 364 is typically the same material as stop layer 358, hence the delineation between them is shown by a dashed line. At this point, however, this distinction is essentially artificial and stop layer 358 and upper cladding layer 364 can be considered a single layer and shall henceforth referred to as upper cladding layer 364.

This can be followed by an upper contact layer 366 of p-type-doped InGaAs which is, for example, a thickness of about 0.05 µm to about 0.3 µm, e.g., about 0.2 µm thick. One function of upper contact layer 366 is to help the metal of the electrodes, after their formation, make a good ohmic contact with the semiconductor. The resulting structure is shown in FIG. 3F.

P-type-doped InP upper cladding layer 364, in combination with the n-type-doped lower cladding layer 346, form a semiconductor p-i-n junction about MQW region 350 and waveguide layers 348 and 356 which are undoped, i.e., intrinsic. This semiconductor p-i-n junction is used for electrically-activated elements in electroabsorption modulator 101. Using a p-i-n junction form allows the electric field to be efficiently concentrated across the intrinsic region. The structure of the p-i-n junction also determines the capacitance of the modulator.

Figure 3F:
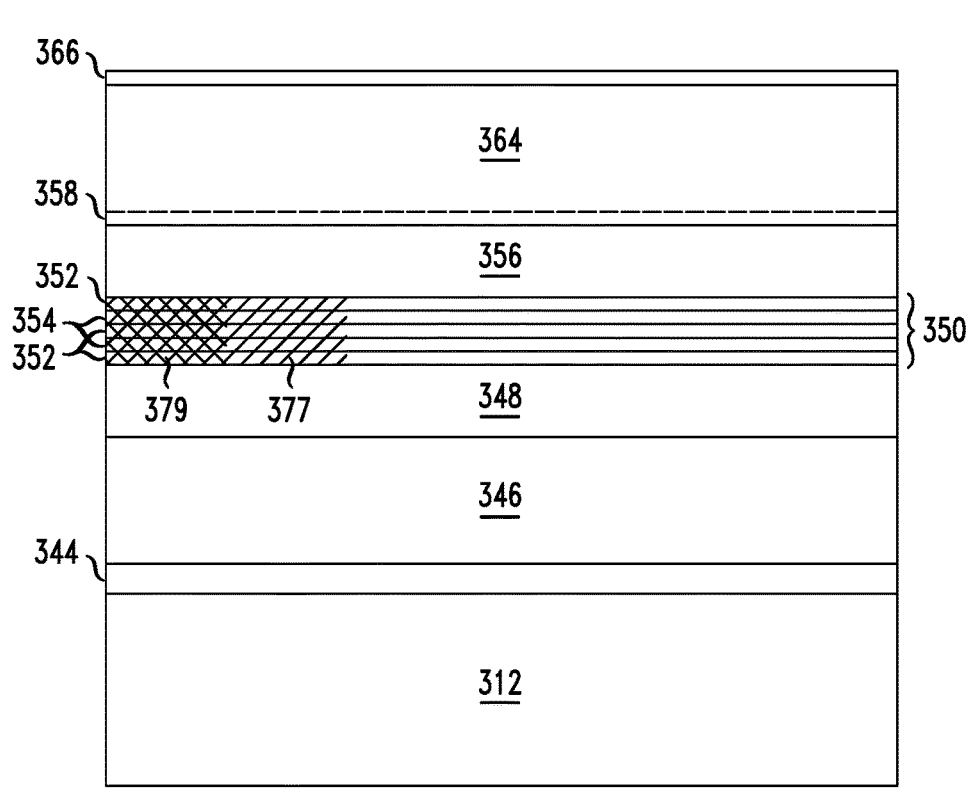
Figure 4A:
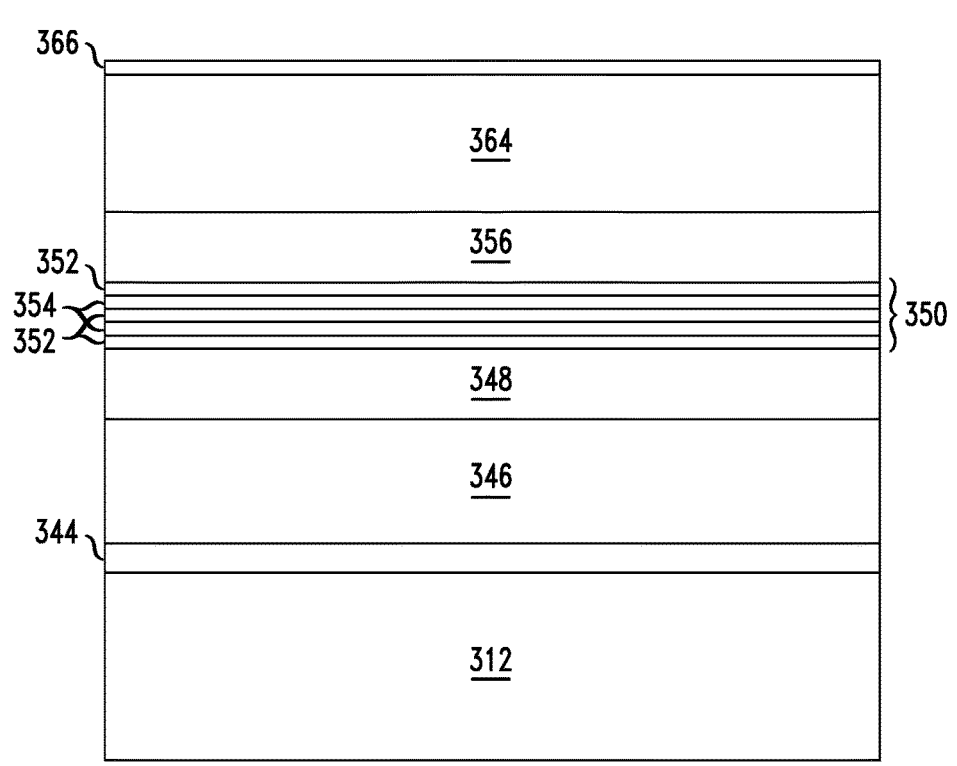
FIGS. 4A through 4E show an end-on cross sectional view of the exemplary electroabsorption modulator of FIG. 1 at various points in its fabrication.

FIG. 4A shows an end-on cross section view of modulator 101 at the same stage of fabrication as is shown in FIG. 3F. In FIG. 4A, the cross section is taken such that the direction of light travel in modulator 101 is into the page. Given that the cross section is taken at one point along modulator 101, it is a view of only one of regions 103, 105, or 107, depending on the depth with respect to input 109 at which the cross section is taken. As such the delineation between regions is not shown in FIG. 4A, nor is there any representation being made about the particular nature of the quantum wells in region 350.

Figure 4B:
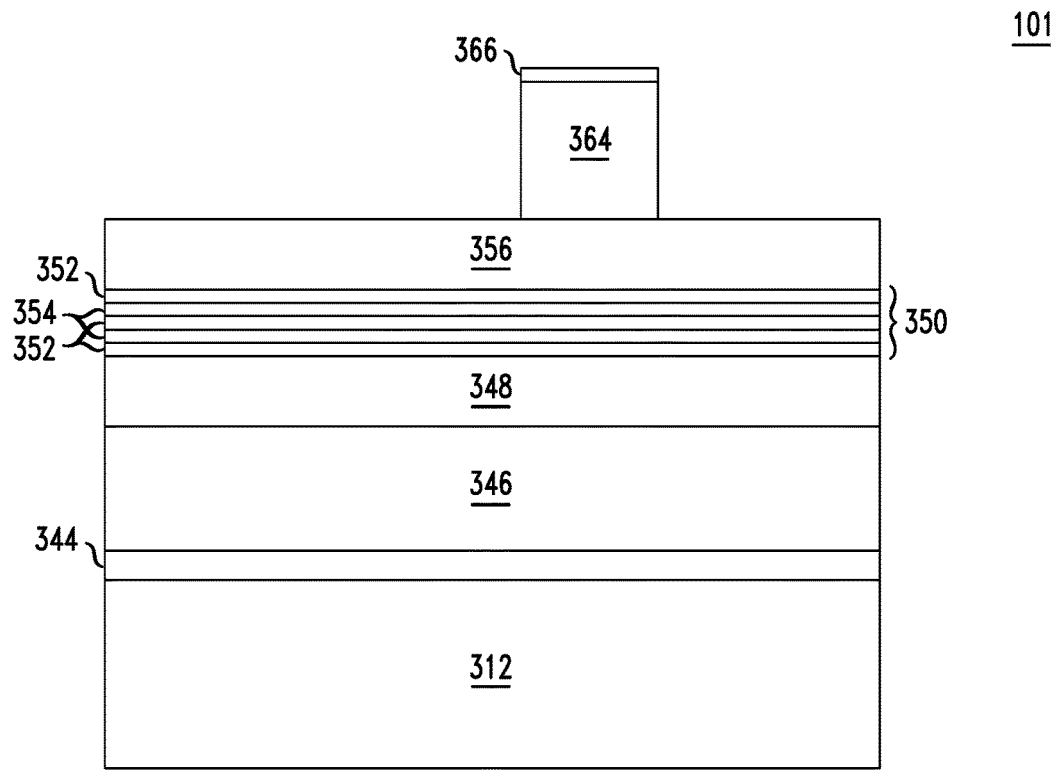

An etch mask (not shown) can be provided over substrate 312 and photolithographically patterned for use in etching down through InGaAs cap layer 366 and InP upper cladding layer 364, as shown in FIG. 4B. This defines an effective width of electroabsorption modulator 101, which can have a width of, for example, about 1 µm to 10 about µm, e.g., about 3 µm. The operation of modulator 101 primarily takes place within its effective width as defined by upper cladding layer 364.

Figure 4C:
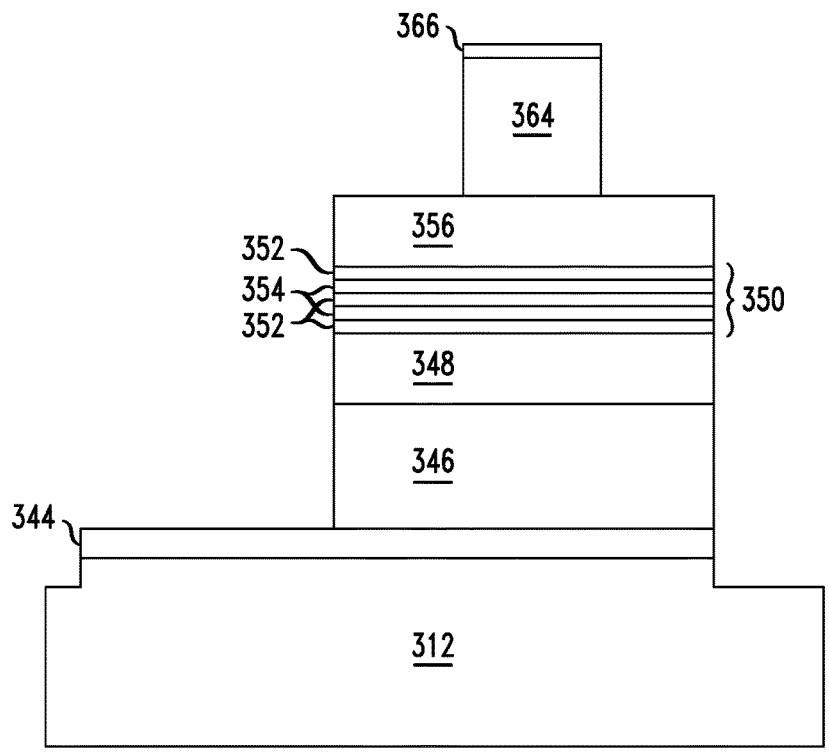

As shown in FIG. 4C, one or more additional etching steps can be used to etch down to the InGaAs lower contact layer 344 and partway into the semi-insulating InP substrate 312.

Figure 4D:
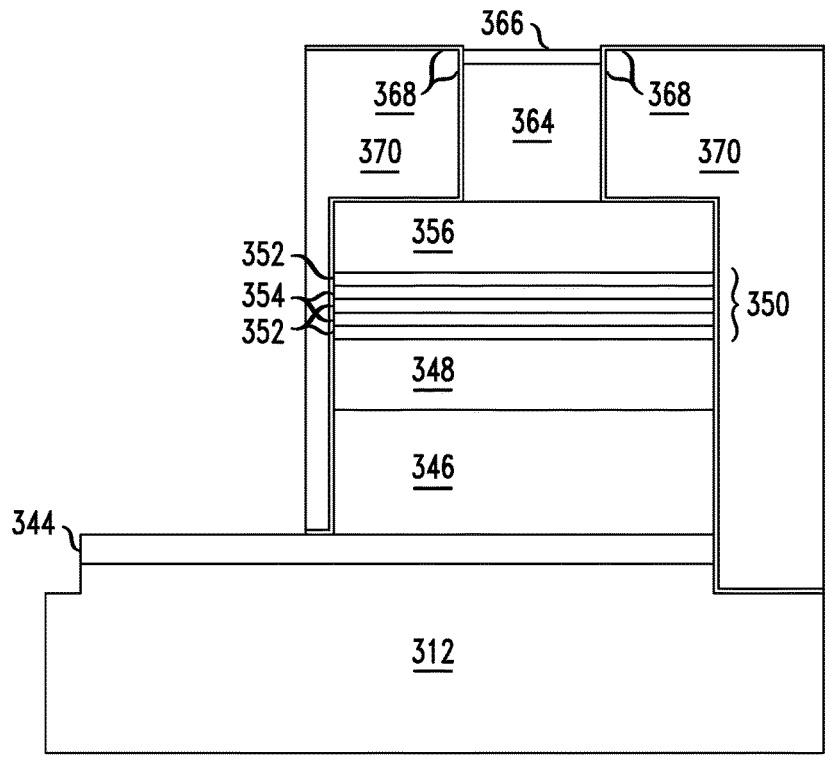

As shown in FIG. 4D, spacer materials may be deposited over substrate 312 about electroabsorption modulator 101 with openings through the spacer materials being created at the locations where the upper and lower electrodes will be formed to better space the upper electrode from lower cladding layer 346. In the example of FIG. 4D, layers of silicon nitride 368 and a layer of benzocyclobutene (BCB) 370 are employed. Silicon nitride layer 368 helps to encapsulate the semiconductor to protect it and allows BCB layer 370 to better adhere to the modulator. Silicon nitride layer 368 is deposited in two steps, one before and one after deposition of BCB layer 370, so that there can be silicon nitride 368 below, on the side of, and on top of BCB layer 370. BCB layer 370 is primarily used as the spacer material to space electrode 324 from lower cladding layer 346. BCB is particularly useful as layer 370 because BCB is a low-k dielectric, i.e., a material having a small dielectric constant relative to silicon dioxide, and such a layer may reduce modulator capacitance and so increase the modulation bandwidth.

Figure 4E:
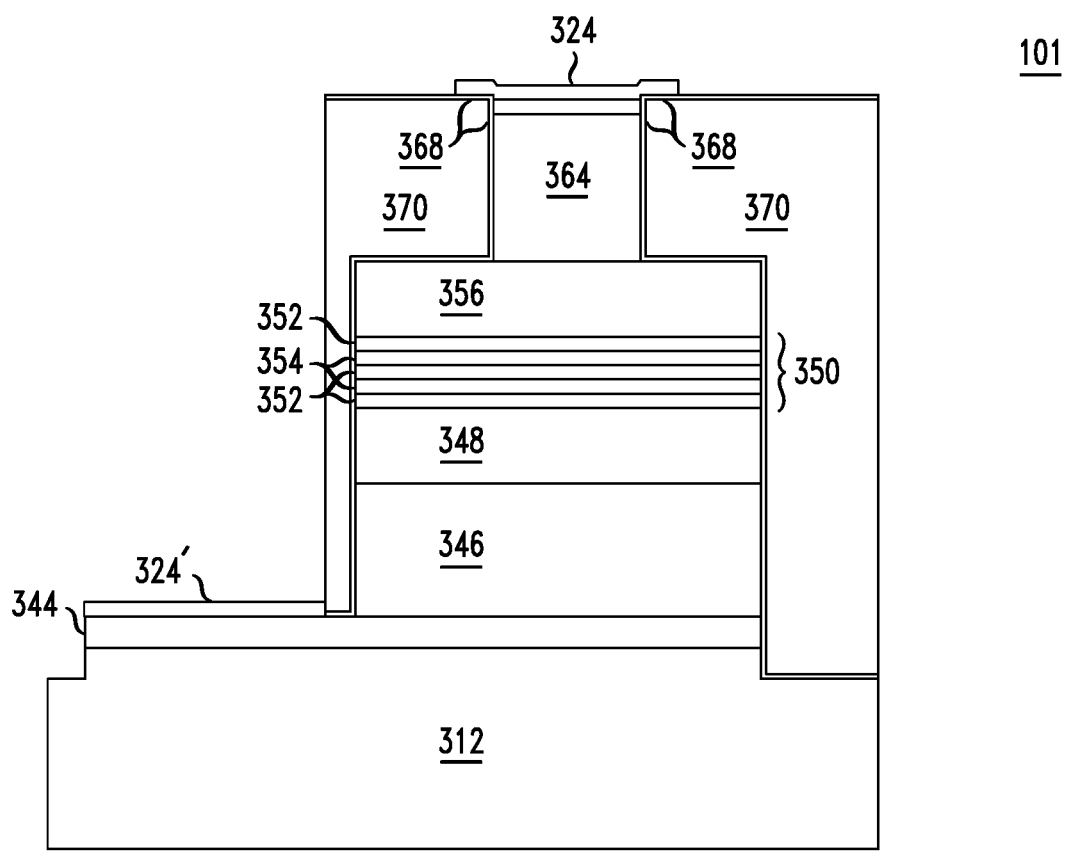

In FIG. 4E, lower electrode 324' and upper electrode 324 may be deposited, e.g., using electron beam evaporation or thermal evaporation. The electrodes extend along the length of the path of the modulator. Lower electrode 324' can be, for example, a gold/germanium/nickel/gold (Au/Ge/Ni/Au) metallization stack with an overall thickness of about 0.5 µm while upper electrode 324, and the wiring leading to it (not shown), can be formed from, for example, a titanium/platinum/gold (Ti/Pt/Au) metallization stack with an overall thickness of about 1 µm. Alternatively, electode 324' can be on the underside of substrate 312. There is also a contact pad extension of electrode 324 along it.

Note that lower electrode 324' is electrically coupled to lower contact layer 344. Electrodes 324 and 324' are used to apply a voltage between them, which results in the application of an electric field from upper electrode 324 through the modulator to lower contact layer 344 along the length of the modulator. Note that the applied voltage is a reverse-bias voltage with respect to the p-i-n diode. The electric field exists primarily within the intrinsic region of the p-i-n junction. The electric field controls the quantum confined Stark effect (QCSE) within the modulator, which changes the effective bandgap, also known as the band edge, bandgap wavelength, or bandgap energy, of each of the sets of quantum wells. With an appropriately applied voltage, the modulator changes from transmissive to absorptive.

In one embodiment of the invention, e.g., modulator 101, the changes in the quantum wells in each region are such that at the front of each section, i.e., the section closest to input 109, the bandgap is such that the region is closer to absorbing at the operating wavelength but is still not absorbing. When a voltage is applied, e.g., across electrodes 324 and 324', all of the regions change to an absorbing mode, but with different coefficients of absorption at the wavelength of interest. Thus, the set of quantum wells in region 107 may have a higher absorption coefficient at the wavelength of interest than the set of quantum wells making up region 105, which in turn may have a higher absorption coefficient at the wavelength of interest than the quantum wells making up region 103.

Those of ordinary skill in the art will recognize that a driving circuit may be employed to switch the modulator on and off. Components of the driving circuit may be integrated on the same substrate as the modulator using conventional techniques.

Those skilled in the art will understand that the electroabsorption optical modulator of the present invention can also be fabricated using other types of III-V compound semiconductor fabrication methods which are well-known in the art. These other types of III-V compound semiconductor fabrication methods include butt-joint regrowth, selective area growth, and the use of offset quantum wells. Such techniques are detailed in the following articles which are incorporated by reference as if fully set forth herein: E. Skogen et al., "Monolithically Integrated Active Components: A Quantum-Well Intermixing Approach," *IEEE Journal of Selected Topics in Quantum Electronics*, vol. 11, pp. 343-355, March/April 2005; and J. W. Raring et al., "40-

Gb/s Widely Tunable Transceivers," *IEEE Journal of Selected Topics in Quantum Electronics*, vol. 13, pp. 3-14, January/February 2007.

In particular, selective area growth is an alternative method to fabricate the modulator device with a continuously changing bandgap along the length of the device. Selective area growth uses a dielectric mask whose width is selected to control the epitaxial growth rate, and by continuously adjusting the width of the mask along the waveguide path, the thickness of the quantum wells, and therefore their absorption bandgap, can be changed along the waveguide path.

What is claimed is:

1. An electroabsorption modulator having an absorption path, the electroabsorption modulator being arranged to have a plurality of regions along the absorption path, at least two of the plurality of regions having respective bandgaps that are different from each other, wherein at least two of the plurality of regions are arranged such that the regions have decreasing bandgap energy along the absorption path of the electroabsorption modulator, wherein the path runs from an optical input of the electroabsorption modulator to an optical output of the electroabsorption modulator.

2. The invention as defined in claim 1 wherein the bandgap of at least one of the plurality of regions is created by a set of quantum wells.

3. The invention as defined in claim 2 wherein the bandgap of the at least one of the plurality of regions created by a set of quantum wells is a function of intermixing of the quantum wells in the set.

4. The invention as defined in claim 1 wherein the electroabsorption modulator is arranged to absorb light at a wavelength of interest and wherein the respective bandgaps of at least two of the plurality of regions are each created by a set of quantum wells, wherein each of the sets of quantum wells are arranged so that their absorption coefficient at the wavelength of interest progressively increases from the optical input onward along the wave guiding axis.

5. The invention as defined in claim 1 further comprising electrodes for applying a voltage to control absorption of light by the modulator.

6. The invention as defined in claim 1 wherein the electroabsorption modulator is arranged to absorb light at a wavelength of interest and wherein the respective bandgaps of at least two of the plurality of regions are each created by a set of quantum wells, wherein the sets of quantum wells are arranged so as to progressively increase their coefficient of absorption at a wavelength of interest from an optical input of the electroabsorption modulator onward along a wave guiding axis of the electroabsorption modulator.

7. An electroabsorption modulator having an absorption path extending from an optical input to an optical output, the electroabsorption modulator comprising a plurality of regions along the absorption path, at least two of the plurality of regions having quantum wells with bandgaps that are different from each other.

8. The invention as defined in claim 7 further comprising a plurality of electrodes configured to apply an electric field along at least a portion of the absorption path.

9. The invention as defined in claim 8 wherein the applied electric field is the result of application of a voltage that is reverse biased with respect to a semiconductor p-i-n junction within the electroabsorption modulator.

10. An electroabsorption modulator having an absorption path extending from an optical input to an optical output and comprising a substrate having deposited thereon a multiple quantum well region, within said absorption path, in which the quantum wells of at least a first portion of the multiple quantum well region and the quantum wells of at least a second portion of the multiple quantum well region have different bandgap energies.

11. The invention as defined in claim 10 wherein the substrate comprises at least one doped or undoped material from the group consisting of: GaAs, AlGaAs, InGaAsP, InGaAs, and InP.

12. The invention as defined in claim 10 wherein the substrate is at least one III-V compound semiconductor material.

13. The invention as defined in claim 10 further comprising a lower waveguide layer and an upper waveguide layer and wherein the multiple quantum well region is sandwiched between the lower waveguide layer and the upper waveguide layer.

14. The invention as defined in claim 10 further comprising:
   a lower waveguide layer;
   an upper waveguide layer;
   a lower cladding layer; and
   an upper cladding layer;
   wherein
   the multiple quantum well region is sandwiched between the lower waveguide layer and the upper waveguide layer; and
   the lower cladding layer is adjacent the lower waveguide layer distal the multiple quantum well region, and the upper cladding layer is adjacent the upper waveguide layer distal the multiple quantum well region.

15. The invention as defined in claim 10 further comprising:
   a lower waveguide layer;
   an upper waveguide layer;
   a lower cladding layer;
   an upper cladding layer;
   a lower electrode; and
   an upper electrode;
   wherein
   the multiple quantum well region is sandwiched between the lower waveguide layer and the upper waveguide layer;
   the lower cladding layer is adjacent the lower waveguide layer distal the multiple quantum well region, and the upper cladding layer is adjacent the upper waveguide layer distal the multiple quantum well region; and
   the upper electrode is electrically coupled to the upper cladding and the lower electrode is electrically coupled to the lower cladding.

16. The invention as defined in claim 10 further comprising:
   a lower waveguide layer;
   an upper waveguide layer;
   a lower cladding layer;
   an upper cladding layer;
   a lower electrode;
   an upper electrode;
   a cap layer; and
   a lower contact layer;
   wherein
   the multiple quantum well region is sandwiched between the lower waveguide layer and the upper waveguide layer;
   the lower cladding layer is adjacent the lower waveguide layer distal the multiple quantum well region, and the upper cladding layer is adjacent the upper waveguide layer distal the multiple quantum well region; and the upper electrode is electrically coupled to the upper cladding via the cap layer and the lower electrode is electrically coupled to the lower cladding via the lower contact layer.

17. The invention as defined in claim 10 wherein the multiple quantum well region is sandwiched between a lower waveguide layer and an upper waveguide layer and wherein the lower wave guide has adjacent thereto distally from the multiple quantum well region a lower cladding layer that is n-type and the upper waveguide layer has adjacent thereto distally from the multiple quantum well region an upper cladding layer that is p-type.

18. The invention as defined in claim 10 wherein the multiple quantum well region further comprises at least two quantum well layers and at least two barrier layers which are arranged such that the quantum well layers are spatially interleaved with the barrier layers.

\* \* \* \* \*